(12) United States Patent
Hirono

(10) Patent No.: US 9,024,555 B2
(45) Date of Patent: May 5, 2015

(54) MOTOR CONTROL DEVICE

(75) Inventor: Daisuke Hirono, Isesaki (JP)

(73) Assignee: Sanden Corporation, Isesaki-shi (JP)

( * ) Notice: Subject to any disclaimer, the term of this patent is extended or adjusted under 35 U.S.C. 154(b) by 438 days.

(21) Appl. No.: 13/322,247

(22) PCT Filed: May 27, 2010

(86) PCT No.: PCT/JP2010/003564
§ 371 (c)(1),
(2), (4) Date: Nov. 23, 2011

(87) PCT Pub. No.: WO2010/137328
PCT Pub. Date: Dec. 2, 2010

(65) Prior Publication Data
US 2012/0074885 A1   Mar. 29, 2012

(30) Foreign Application Priority Data
May 27, 2009 (JP) .................. 2009-127749

(51) Int. Cl.
*H02H 7/09* (2006.01)
*H02M 1/32* (2007.01)
*H02P 6/12* (2006.01)
*H02P 6/18* (2006.01)
(Continued)

(52) U.S. Cl.
CPC ............. *H02M 1/32* (2013.01); *H02M 7/53875* (2013.01); *H02P 6/12* (2013.01); *H02P 6/182* (2013.01); *H02P 29/027* (2013.01); *H02P 29/021* (2013.01); *H02H 7/0805* (2013.01)

(58) Field of Classification Search
CPC ........ H02P 27/026; H02P 27/08; H02P 6/002

USPC ................ 318/799, 801, 805, 806, 812, 434, 318/400.22
See application file for complete search history.

(56) References Cited

U.S. PATENT DOCUMENTS 6,384,567 B1 * 5/2002 Maeda ........................ 318/801
6,577,087 B2 * 6/2003 Su ............................ 318/400.07
(Continued)

FOREIGN PATENT DOCUMENTS

JP   08-029470   2/1996
JP   2002-325353   11/2002
(Continued)

OTHER PUBLICATIONS

English translation (done by computer) of JP 2001-320894, Feb. 24, 2014.*
(Continued)

*Primary Examiner* — Rina Duda
(74) *Attorney, Agent, or Firm* — Greer Burns & Crain, Ltd.

(57) ABSTRACT

A motor control device has an overcurrent test unit to send a first test voltage Vt1 lower than a reference voltage Vref for overcurrent determination and a second test voltage Vt2 not lower than the reference voltage Vref to an overcurrent determination unit when a synchronous motor is not rotated. The motor control device determines that an abnormality occurs in the overcurrent detection unit when the overcurrent determination unit determines that the first test voltage Vt1 causes an overcurrent on the basis of a comparison result, or the second test voltage Vt2 causes no overcurrent on the basis of the comparison result.

5 Claims, 4 Drawing Sheets

(51) Int. Cl.
*H02P 29/02* (2006.01)
*H02H 7/08* (2006.01)
*H02M 7/5387* (2007.01)

(56) References Cited

U.S. PATENT DOCUMENTS

| | | | |
|---|---|---|---|
| 6,914,409 B2* | 7/2005 | Nukushina | 318/800 |
| 7,466,086 B2* | 12/2008 | Kiuchi et al. | 318/41 |
| 2003/0020431 A1* | 1/2003 | Kiuchi et al. | 318/779 |

FOREIGN PATENT DOCUMENTS

| | | |
|---|---|---|
| JP | 2004-173348 | 6/2004 |
| JP | 2006-160030 | 6/2006 |
| JP | 2001-320894 | 11/2011 |
| WO | WO 2005/004319 A1 | 1/2005 |

OTHER PUBLICATIONS

International Search Report issued in PCT/JP2010/003564 dated Sep. 21, 2010.

* cited by examiner

PRIOR ART

MOTOR CONTROL DEVICE

TECHNICAL FIELD

The present invention relates to a motor control device provided with overcurrent detection means for an inverter.

BACKGROUND ART

FIG. 1 shows the constitution of this kind of conventional motor control device. In the drawing, reference numeral 11 denotes a motor, reference numeral 12 denotes an inverter, reference numeral 13 denotes a direct current power source, and reference numeral 14 denotes a controller incorporated with a microcomputer. The controller 14 is equipped with a rotation control unit 15, an inverter driving unit 16, a phase current detection unit 17, and an overcurrent detection unit 18.

The motor 11 is composed of a three-phase DC brushless motor, and has a stator (not shown) including coils for three phases (a U-phase coil Uc, a V-phase coil Vc, and a W-phase coil Wc), and a rotor (not shown) including a permanent magnet. As shown in the drawing, the U-phase coil Uc, the V-phase coil Vc, and the W-phase coil Wc are connected in a star connection about a neutral point N or a delta connection.

The inverter 12 is composed of a three-phase bipolar drive inverter, and has three-phase switching elements corresponding to the coils for three phases in the motor 11, specifically, six switching elements composed of IGBT or the like (upper-phase switching elements Us, Vs, and Ws; and lower-phase switching elements Xs, Ys, and Zs); and shunt resistors Ru, Rv, and Rw. Each of shunt resistors Ru, Rv, and Rw is for detecting the voltage serving as the current flowing in each phase of the inverter 12.

The upper-phase switching element Us, the lower-phase switching element Xs, and the shunt resistor Ru are arranged in series and the both ends thereof are connected to the direct current power source 13; the upper-phase switching element Vs, the lower-phase switching element Ys, and the shunt resistor Rv are arranged in series and the both ends thereof are connected to the direct current power source 13; and the upper-phase switching element Ws, the lower-phase switching element Zs, and the shunt resistor Rw are arranged in series and the both ends thereof are connected to the direct current power source 13.

The emitter side of the upper-phase switching element Us is connected to the U-phase coil Uc of the motor 11; the emitter side of the upper-phase switching element Vs is connected to the V-phase coil Vc of the motor 11; and the emitter side of the upper-phase switching element Ws is connected to the W-phase coil Wc of the motor 11. Furthermore, the gates of the upper-phase switching elements Us, Vs, and Ws; and the gates of the lower-phase switching elements Xs, Ys, and Zs are connected to the inverter driving unit 16.

Furthermore, the lower-phase switching element Xs side of the shunt resistor Ru is connected to the phase current detection unit and the overcurrent detection unit 18; the lower-phase switching element Ys side of the shunt resistor Rv is connected to the phase current detection unit 17 and the overcurrent detection unit 18; and the lower-phase switching element Zs side of the shunt resistor Rw is connected to the phase current detection unit 17 and an overcurrent detection unit 18.

The rotation control unit 15 sends control signals for rotating the motor 11 at a prescribed rotation speed or stopping the rotation to the inverter driving unit 16 on the basis of the operation command from the operation unit (not shown).

The inverter driving unit 16 sends driving signals for turning each switching element ON or OFF to the gates of the upper-phase switching element Us, Vs, and Ws; and the gates of the lower-phase switching element Xs, Ys, and Zs of the inverter 12 on the basis of the control signals from the rotation control unit 15. The upper-phase switching element Us, Vs, and Ws; and the lower-phase switching element Xs, Ys, and Zs of the inverter 12 are turned ON or OFF in prescribed patterns by the driving signals from the inverter driving unit 16; and perform a conduction on the basis of the ON-OFF pattern, specifically, a sin wave conduction (180 degrees conduction) or a square wave conduction (120 degrees conduction) to the U-phase coil Uc, the V-phase coil Vc, and the W-phase coil Wc of the motor 11.

The phase current detection unit 17 detects currents (U-phase current Iu, V-phase current Iv, and W-phase current Iw) flowing in the U-phase coil Uc, the V-phase coil Vc, and the W-phase coil Wc of the motor 11 on the basis of the Voltages Vru, Vrv, and Vrw detected in each of the shunt resistors Ru, Rv, and Rw of the inverter 12; and sends these currents to the rotation control unit 15 as detected signals. The rotation control unit 15 detects the rotor location of the motor 11 by the detection signals (U-phase current Iu, V-phase current Iv, and W-phase current Iw) from the phase current detection unit 17.

The overcurrent detection unit 18 compares the Voltages Vru, Vrv, and Vrw detected in each of the shunt resistors Ru, Rv, and Rw (including amplified cases) of the inverter 12 with the reference voltage Vref for overcurrent determination by the comparator, and sends comparison results to the rotation control unit 15 as detected signals. The rotation control unit 15 determines presence or absence of overcurrent by the detected signals (comparison results) from the overcurrent detection unit 18, and when the presence of overcurrent is determined, the rotation control unit 15 sends the control signals for stopping the conduction by the inverter 12 to the inverter driving unit 16 for protecting the inverter 12.

Incidentally, the overcurrent protecting function performed by the rotation control unit 15 of the motor control device is assumed that the overcurrent detection unit 18 is normally operated. Therefore, even if the overcurrent occurs when an abnormality such as failure occur in the overcurrent detection unit 18, the overcurrent protecting function is not performed. Thereby, various problems such as failure of the switching element of the inverter 12, the blow-out of a power fuse, or the actuation of a circuit breaker occur by the overcurrent.

Furthermore, when the various problems occur due to the abnormality in the overcurrent detection unit 18, a long time is required for figuring out the cause. Even if the cause is figured out, a considerable amount of time and cost will be consumed for recovery treatments of the various problems.

PRIOR ART LITERATURE

Patent Literature

Patent Literature 1: Japanese Patent Publication 2002-325353

SUMMARY OF THE INVENTION

Problems to be Solved by the Invention

An object of the present invention is to provide a motor control device that can diagnose an abnormality in overcurrent detection means and can previously avoid various problems caused by the abnormality.

Means for Solving the Problems

In order to achieve the object, a motor control device based on the present invention having voltage detection means to detect a voltage serving as a current flowing in an inverter for a motor; overcurrent detection means to compare a detected voltage from the voltage detection means with a reference voltage for overcurrent determination; and overcurrent determination means to determine presence or absence of overcurrent on the basis of a detection signal from the overcurrent detection means; wherein the motor control device comprises: overcurrent test means to send a test voltage not lower than the reference voltage in place of the detected voltage to the overcurrent detection means when the motor is not rotated; and abnormal diagnosis means to determine that an abnormality occurs in the overcurrent detection means when the overcurrent determination means determines that the test voltage from the overcurrent test means causes no overcurrent.

This motor control device comprises the overcurrent test means to send the test voltage not lower than the reference voltage in place of the detected voltage to the overcurrent detection means when the motor is not rotated; and the abnormal diagnosis means to determine that the abnormality occurs in the overcurrent detection means when the overcurrent determination means determines that the test voltage from the overcurrent test means causes no overcurrent. Therefore, even if the abnormality such as failure occur in the overcurrent detection means, this abnormality can be exactly diagnosed. Thereby, the occurrence of the various problems based on the abnormality in the overcurrent detection means such as failure of the switching element of the inverter, the blow-out of a power fuse, or the actuation of a circuit breaker and the consumption of the considerable amount of time and cost based on the investigation for the cause of the various problems and the recovery treatments for the various problems can be previously and reliably avoided.

Advantageous Effects of the Invention

According to the present invention, a motor control device, that can diagnose the abnormality in overcurrent detection means and can previously avoid the various problems caused by the abnormality can be provided.

The object and other objects, constitutional features, functions and effects of the present invention will be cleared by the following description and the attached drawings.

EMBODIMENTS FOR CARRYING OUT THE INVENTION

Figure 2:
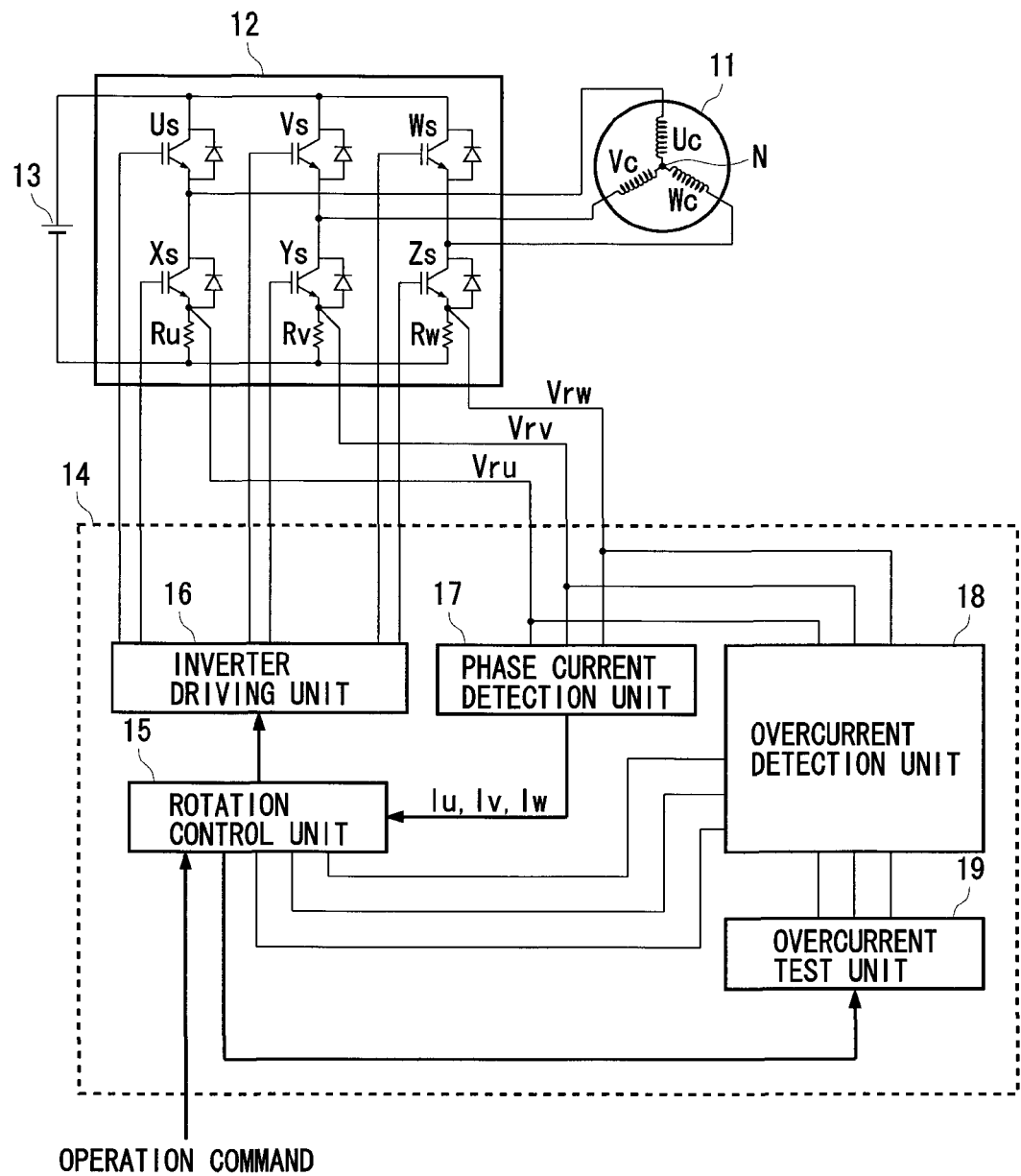
FIG. 2 is a configuration diagram of a motor control device applied the present invention.

FIG. 2 shows a motor control device applied the preset invention. In the drawing, reference numeral 11 denotes a motor, reference numeral 12 denotes an inverter, reference numeral 13 denotes a direct current power source, and reference numeral 14 denotes a controller incorporated with a microcomputer. The controller 14 is equipped with a rotation control unit 15, an inverter driving unit 16, a phase current detection unit 17, an overcurrent detection unit 18, and an overcurrent test unit 19.

Figure 1:
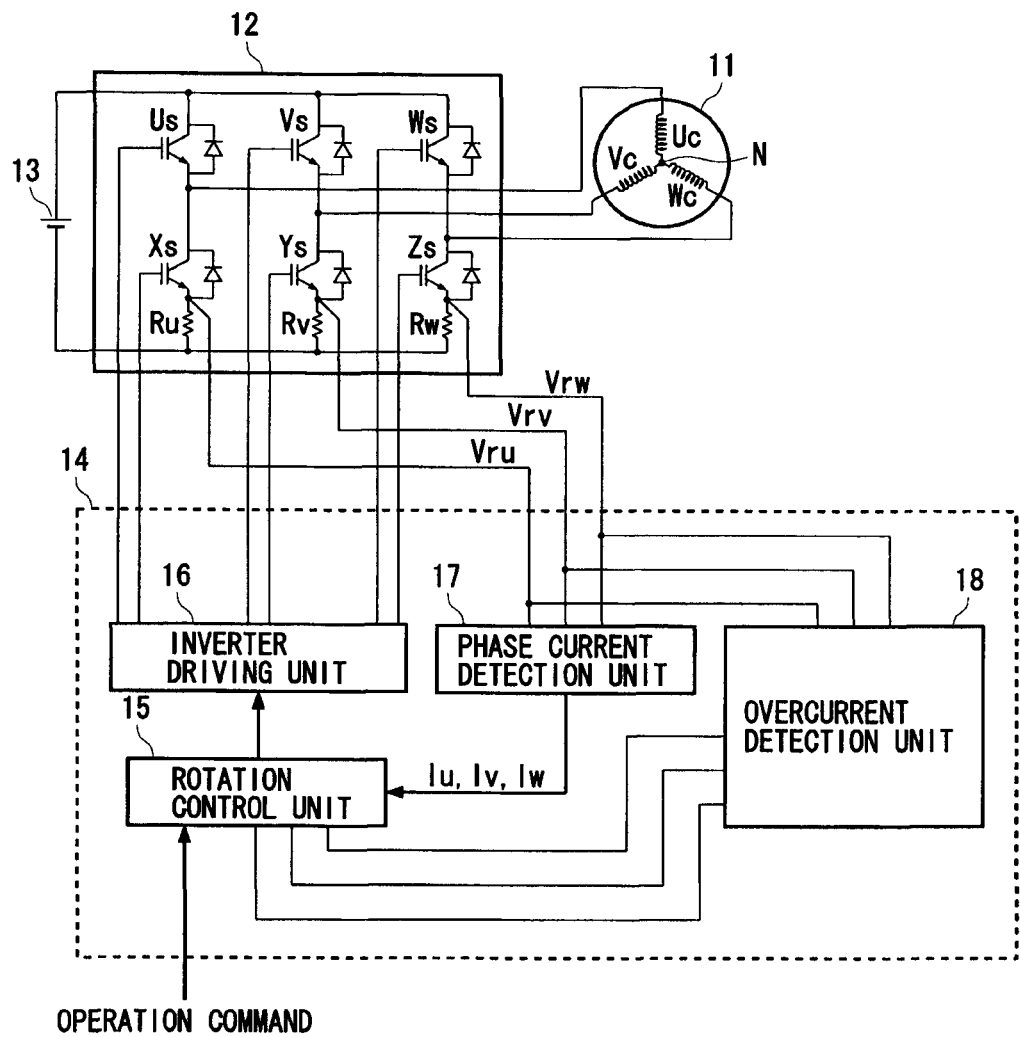
FIG. 1 is a configuration diagram of a conventional motor control device.

What the motor control device shown in FIG. 2 is different from the conventional motor control devices shown in FIG. 1 in the configurations are:

a point of equipping the overcurrent test unit 19 used when an abnormality in the overcurrent detection unit 18 is diagnosed, and a point of having a function to diagnose the abnormality in the overcurrent detection unit 18 utilizing the overcurrent test unit 19. Since others are the same as in conventional motor control devices shown in FIG. 1, identical signs will be used, and the description thereof will be omitted.

Figure 3:
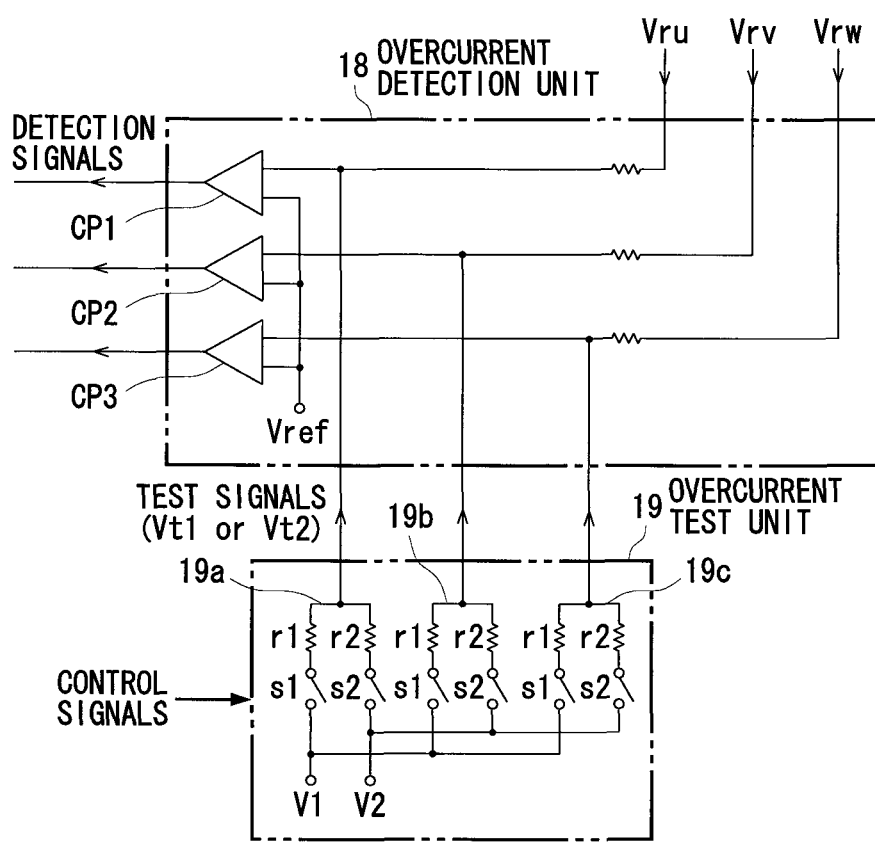
FIG. 3 is a detailed diagram of a overcurrent detection unit and a overcurrent test unit shown in FIG. 2.

As shown in FIG. 3, the overcurrent detection unit 18 has three comparators CP1, CP2, and CP3. In the input terminal of the comparator CP1, a voltage Vru detected by a shunt resistor Ru is inputted via a resistor; in the input terminal of the comparator CP2, a voltage Vrv detected by a shunt resistor Rv is inputted via a resistor; and in the input terminal of the comparator CP3, a voltage Vrw detected by a shunt resistor Rw is inputted via a resistor. Briefly, the overcurrent detection unit 18 compares voltages Vru, Vrv, and Vrw (including the amplitude case) with the reference voltage Vref for overcurrent determination by respective comparators CP1, CP2, and CP3, and sends compared results to the rotation control unit 15 as detected signals.

As shown in FIG. 3, the overcurrent test unit 19 has three testers 19a, 19b, and 19c each composed of a first switch s1, a second switch s2, a first resistor r1, and a second resistor r2. For the first switch s1 and the second switch s2 of respective testers 19a, 19b, and 19c, openable and closable switching elements such as transistor on the basis of control signals from the rotation control unit 15 are used. The first switch s1 and the first resistor r1 of each of the testers 19a, 19b, and 19c are arranged in series and an end is connected to the first power source V1, and the second switch s2 and the second resistor r2 are arranged in series and an end is connected to the first power source V2. Furthermore, the output side of the tester 19a is connected to the input terminal side of the comparator CP1 of the overcurrent detection unit 18, the output side of the tester 19b is connected to the input terminal side of the comparator CP2 of the overcurrent detection unit 18, and the output side of the tester 19c is connected to the input terminal side of the comparator CP3 of the overcurrent detection unit 18.

In this overcurrent test unit 19, by closing only the first switch s1 of the respective tester 19a, 19b, and 19c, the test voltage Vt1 lower than the reference voltage Vref for overcurrent determination can be provided as a test signal to the input terminal side of respective comparators CP1, CP2, and CP3 for the overcurrent detection unit 18; and by closing both the first switch s1 and the second switch s2, the test voltage Vt2 not lower than the reference voltage Vref can be provided as a test signal to the input terminal side of respective comparators CP1, CP2, and CP3 of the overcurrent detection unit 18.

In other words, so as to obtain the test voltage Vt1 lower than the reference voltage Vref for overcurrent determination and the test voltage Vt2 not lower than the reference voltage Vref for overcurrent determination, the voltage value of the first power source V1 and the voltage value of the second power source V2, and the resistance value of the first resistor r1 and the second resistor r2, and the like are selected. For example, when the first power source V1 and the second power source V2 have the same voltage value, and the first resistor r1 and the second resistor r2 have the same resistance value, the test voltage Vt2 has about twice the value of the test voltage Vt1.

Figure 4:
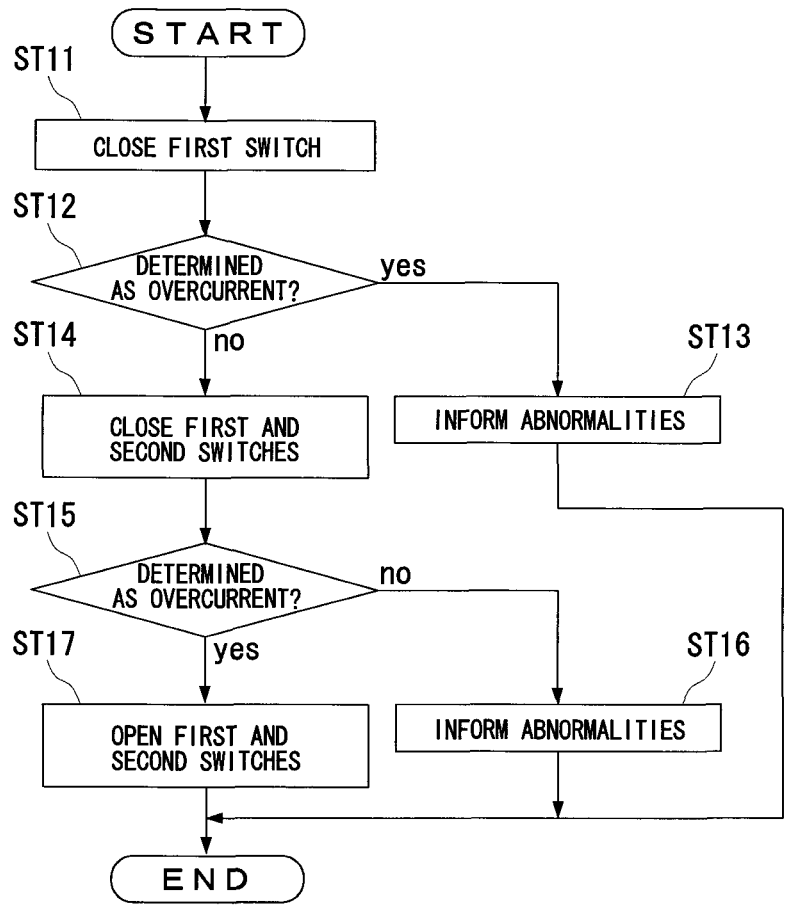
FIG. 4 is a diagram showing an abnormal diagnosis flow carried out by the motor control device shown in FIG. 2.

FIG. 4 shows a flow when the abnormality in the overcurrent detection unit 18 is diagnosed utilizing the overcurrent test unit 19. The abnormal diagnosis flow is executed when the motor 11 is not rotated, specifically, in the timing immediately after the major power source of the motor control device is turned on; the timing immediately after the operation command for starting the rotation of the motor 11 is input to the rotation control unit 15; or the timing immediately after the operation command for stopping the rotation of the motor 11 is input to the rotation control unit 15.

In this abnormal diagnosis flow, first at the timing, the control signals to close only the first switch s1 of the respective testers 19a, 19b, and 19c are sent from the rotation control unit 15 to the overcurrent test unit 19; and only the first switch s1 of the respective testers 19a, 19b, and 19c is closed (refer to step ST11 in FIG. 4). When only the first switch s1 of the respective testers 19a, 19b, and 19c is closed, the test voltage Vt1 is provided from the overcurrent test unit 19 to the input terminals of the respective comparators CP1, CP2, and CP3 of the overcurrent detection unit 18 as test signals.

The overcurrent detection unit 18 compares the test voltage Vt1 from the overcurrent test unit 19 with the reference voltage Vref for overcurrent determination by the respective comparators CP1, CP2, and CP3, in the same way as in the overcurrent determination for voltages Vru, Vrv, and Vrw detected in respective shunt resistors Ru, Rv, and Rw; and sends the comparison results as detection signals to the rotation control unit 15. The rotation control unit 15 determines the presence or absence of overcurrent on the basis of the detection signals (comparison results) from the overcurrent detection unit 18 (refer to Step ST12 in FIG. 4).

As described before, since the test voltage Vt1<reference voltage Vref, when the overcurrent detection unit 18 normally operates, the test voltage Vt1 is determined to have no overcurrent in the step ST12. However, if it is determined to have overcurrent in the step ST12, it is regarded that the abnormality such as failure of the overcurrent detection unit 18 occurs, and the abnormality is informed by the lighting of the alarm lamp, the generation of an alarm sound or the like (refer to Step ST13 in FIG. 4). The user takes the action such as to disconnect the major power source on the basis of the information of the abnormality.

When it is determined that there is no overcurrent in the step ST12, the control signals to close both the first switch s1 and the second switch s2 of respective testers 19a, 19b, and 19c are sent from the rotation control unit 15 to the overcurrent test unit 19; and both the first switch s1 and the second switch s2 of respective testers 19a, 19b, and 19c are closed (refer to Step ST14 in FIG. 4). When both the first switch s1 and the second switch s2 of respective testers 19a, 19b, and 19c are closed, the test voltage Vt2 is provided from the overcurrent test unit 19 to the input terminals of respective comparator CP1, CP2, and CP3 of the overcurrent detection unit 18 as the test signal.

The overcurrent detection unit 18 compares the test voltage Vt2 from the overcurrent test unit 19 with the reference voltage Vref for overcurrent determination by the respective comparators CP1, CP2, and CP3, in the same manner as the overcurrent determination for voltages Vru, Vrv, and Vrw detected in respective shunt resistors Ru, Rv, and Rw; and sends comparison results as detection signals to the rotation control unit 15. The rotation control unit 15 determines the presence or absence of overcurrent on the basis of the detected signals (comparison results) from the overcurrent detection unit 18 (refer to Step ST15 in FIG. 4).

As described before, since the test voltage Vt2 reference voltage Vref, when the overcurrent detection unit 18 normally operates, the test voltage Vt2 is determined to have overcurrent in the step ST15. However, if it is determined to have no overcurrent in the step ST15, it is regarded that the abnormality such as failure of the overcurrent detection unit 18 occurs; and the abnormality is informed by the lighting of the alarm lamp, the generation of an alarm sound or the like (refer to Step ST16 in FIG. 4). The user takes the action such as to disconnect the major power source on the basis of the information of the abnormality.

When it is determined that there is overcurrent in the step ST15, the control signals to open both the first switch s1 and the second switch s2 of respective testers 19a, 19b, and 19c are sent from the rotation control unit 15 to the overcurrent test unit 19; and both the first switch s1 and the second switch s2 of respective testers 19a, 19b, and 19c are opened (refer to Step ST17 in FIG. 4).

If the abnormal diagnosis is performed, even if the abnormality such as failure in the overcurrent detection unit 18, this abnormality can be exactly diagnosed. Thereby, the occurrence of the various problems based on the abnormality in the overcurrent detection unit 18 such as failure of the switching elements of the inverter 12, the blow-out of a power fuse, or the actuation of a circuit breaker and the consumption of the considerable amount of time and cost based on the investigation for the cause of the various problems and the recovery treatments for the various problems can be previously and reliably avoided.

Especially, the abnormal diagnosis is extremely useful when the motor 11 is a motor used as the running power source in hybrid vehicles, electric vehicles or the like, or when the motor 11 is a motor as the compressor power source in the air conditioners for vehicles. Specifically, if the various problems are caused by the abnormality in the overcurrent detection unit 18 in any case, there may be possibilities that the travel based on the motor power is suddenly stopped, and that the accident is occurred during travel by the motor power in the former case; and there may be possibilities that the driver and so on feel discomfort due to the stopping of the air conditioner and that the condition of non-healthy peoples become worse in the latter case. However, according to the abnormal diagnosis, the possibilities can be swept away, and the secure feeling and the trust feeling of the users can be improved.

By the way, in the motor control device shown in FIG. 2, since the shunt resistors Ru, Rv, and Rw for detecting the voltage serving as a current flowing each phase of the inverter 12 are assembled in the inverter 12, when an abnormality occurs in the shunt resistors Ru, Rv, and Rw, even if the overcurrent detection unit 18 is normally operated, the desired overcurrent detection cannot be performed when the motor 11 is rotated. Specifically, in order to perform desired overcurrent detection accurately, it is desired that whether the abnormality such as failure in the shunt resistors Ru, Rv, and Rw occurs or not is diagnosed when the motor 11 is rotated.

Figure 5:
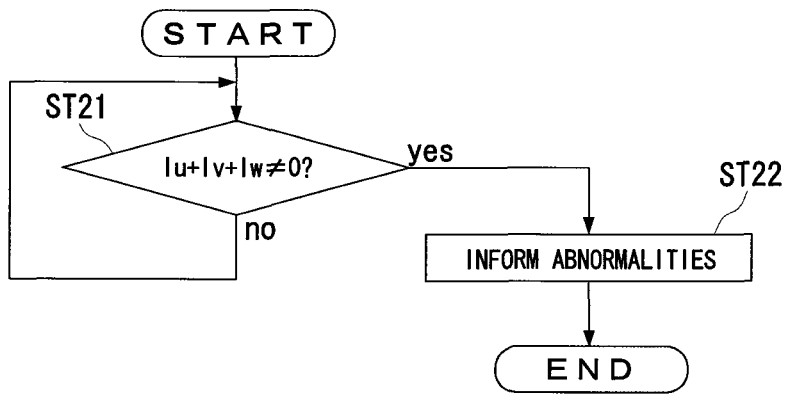
FIG. 5 is a diagram showing another abnormal diagnosis flow carried out by the motor control device shown in FIG. 2.

FIG. 5 shows the flow when the abnormal diagnosis of the shunt resistors Ru, Rv, and Rw is performed. The abnormal diagnosis flow is executed when a synchronous motor 11 is rotated, and a current flows in respective shunt resistors Ru, Rv, and Rw.

In this abnormal diagnosis flow, whether the sum of the U-phase current Iu, the V-phase current Iv, and the W-phase current Iw detected by the phase current detection unit 17 is zero or not is determined in the rotation control unit 15 (refer to the Step ST21 in FIG. 5).

Since "U-phase current Iu+V-phase current Iv+W-phase current Iw=0" when the motor 11 is rotated and a current flows in respective shunt resistors Ru, Rv, and Rw, it is regarded that the abnormality such as failure occurs in any of the shunt resistors Ru, Rv, and Rw when it is regarded that "U-phase current Iu+V-phase current Iv+W-phase current Iw≠0" in the step ST21, and the abnormality is informed by the lighting of an alarm lamp, the generation of an alarm sound or the like (refer to the Step ST22 in FIG. 5). The user takes the action such as to disconnect the major power source based on the information of the abnormality.

If the abnormal diagnosis is performed together with the above-described abnormal diagnosis, even if the abnormality occurs in the shunt resistors Ru, Rv, and Rw, this abnormality can be exactly diagnosed. Thereby, the various problems such that desired overcurrent detection cannot be performed when the motor 11 rotates due to the abnormality in the shunt resistors Ru, Rv, and Rw can be obviated, and the consumption of the considerable amount of time and cost based on the investigation for the cause of the various problems and the recovery treatments for the various problems can be avoided.

Especially, the abnormal diagnosis is extremely useful when the motor 11 is a motor used as the running power source in hybrid vehicles, electric vehicles or the like, or when the motor 11 is a motor as the compressor power source in the air conditioners for vehicles. Specifically, if the various problems are caused by the abnormality in the overcurrent detection unit 18 in any case, there may be possibilities that the travel based on the motor power is suddenly stopped, and that the accident is occurred during travel by the motor power in the former case; and there may be possibilities that the driver and so on feel discomfort due to the stopping of the air conditioner and that the condition of non-healthy peoples become worse in the latter case. However, according to the abnormal diagnosis, the possibilities can be swept away, and the secure feeling and the trust feeling of the users can be improved.

Incidentally, in the above-described embodiment, the shunt resistors Ru, Rv, and Rw of the inverter 12 correspond to the "voltage detection means" in the claims; the overcurrent detection unit 18 corresponds to the "overcurrent detection means" in the claims; the processing for the overcurrent determination in the rotation control unit 15 corresponds to the "overcurrent determination means" in the claims; the overcurrent test unit 19 corresponds to the "overcurrent test means" and the "second overcurrent test means" in the claims; and the processing for the abnormal diagnosis in the rotation control unit 15 corresponds to the "abnormal diagnosis means" and the "second abnormal diagnosis means".

By the way, in the above-described embodiments, the flow, wherein the abnormal diagnosis on the basis of the test voltage Vt1 in conjunction with the abnormal diagnosis on the basis of the test voltage Vt2 are performed, is exemplified. However, since the various problems as described above are caused by the overcurrent, if only the abnormal diagnosis on the basis of the test voltage Vt2 alone is performed without the abnormal diagnosis on the basis of the test voltage Vt1, the desired objects can be sufficiently achieved. Of course, it is needless to say that the abnormal diagnosis capability can be enhanced if the abnormal diagnosis on the basis of the test voltage Vt1 is performed in combination.

Also in the above-described embodiments, the motor control device, wherein the three-phase bipolar driving system inverter for the three-phase DC brushless motor is provided as the inverter 12, is exemplified. However, if it is a motor control device equipped with an inverter for a motor; for example, a motor control device equipped with an inverter for a DC brushless motor other than three-phase (including the unipolar drive system); a motor control device equipped with an inverter for at least one phase for a synchronous motor other than a DC brushless motor; a motor control device equipped with an inverter for at least one phase for an induction motor; or a motor control device equipped with an inverter for other motors; can exert functions and effects equivalent with the above-described functions and effects by using the present invention.

Furthermore, in the above-mentioned embodiments, the motor control device, wherein the shunt resistors Ru, Rv, and Rw for detecting the voltage serving as the current flowing in each phase of the inverter 12 are assembled in the inverter 12, is exemplified. However, if it is a motor control device equipped with the voltage detection means to detect the voltage serving as the current flowing in the inverter (including the other types of inverters as described in the previous paragraph) for the motor; for example, a motor control device wherein the shunt resistors Ru, Rv, and Rw are arranged outside of the inverter 12; or a motor control device wherein sensors (for example, sensors or the like utilizing a current transformer or a Hall element) playing the role of the shunt resistors Ru, Rv, and Rw are placed in the same position or other positions; can exert functions and effects equivalent with the above-described functions and effects by using the present invention.

INDUSTRIAL APPLICABILITY

The present invention is preferred as a motor control device equipped with overcurrent detection means for an inverter.

EXPLANATION OF LETTERS OR NUMERALS

11 . . . Motor,
Uc . . . U-phase coil,
Vc . . . V-phase coil,
Wc . . . W-phase coil,
12 . . . inverter,
Us, Vs, Ws . . . upper-phase switching elements,
Xs, Ys, Zs . . . lower-phase switching elements,
Ru, Rv, Rw . . . shunt resistors,
13 . . . direct current power source,
14 . . . controller,
15 . . . rotation control unit,
16 . . . inverter driving unit,
17 . . . phase current detection unit,
18 . . . overcurrent detection unit,
19 . . . overcurrent test unit

The invention claimed is:

1. A motor control device having voltage detection means to detect a voltage serving as a current flowing in an inverter for a motor; overcurrent detection means to compare a detected voltage from the voltage detection means with a reference voltage for overcurrent determination; and overcurrent determination means to determine presence or absence of overcurrent on the basis of a detection signal from the overcurrent detection means; wherein the motor control device comprises:

overcurrent test means to send a test voltage not lower than the reference voltage in place of the detected voltage to the overcurrent detection means when the motor is not rotated;

abnormal diagnosis means to determine that an abnormality occurs in the overcurrent detection means when the overcurrent determination means determines that the detection signal sent from the overcurrent detection means at the time when the test voltage is sent to the overcurrent detection means causes no overcurrent;

second overcurrent test means to send a second test voltage lower than the reference voltage in place of the detected voltage to the overcurrent means when the motor is not rotated; and second abnormal diagnosis means to determine that an abnormality occurs in the overcurrent detection means when the overcurrent determination means determines that the detection signal sent from the overcurrent detection means at the time when the second test voltage is sent to the overcurrent detection means causes an overcurrent.

2. The motor control device according to claim 1, further comprising abnormal information means to inform the abnormality when the abnormal diagnosis means or the second abnormal diagnosis means determines that the abnormality occurs in the overcurrent detection means.

3. The motor control device according to claim 1, wherein the motor is a synchronous motor having multi-phase coils in a stator, and the inverter is an inverter having multi-phase switching elements corresponding to the multi-phase coils of the synchronous motor.

4. The motor control device according to claim 3, wherein the voltage detection means is composed of shunt resistors for detecting voltages serving as currents flowing in each phase of the inverter.

5. The motor control device according to claim 4, further comprising current detection means to detect currents flowing in the multi-phase coils of the synchronous motor when the synchronous motor is rotated; and third abnormal diagnosis means to determine that an abnormality occurs in the shunt resistors when a sum of detected currents from the current detection means is not zero.

* * * * *